W. M. AND P. D. ROBERTS.
MACHINE FOR AND METHOD OF MAKING PASTRY CONES.
APPLICATION FILED FEB. 7, 1921.
1,423,259.
Patented July 18, 1922.
7 SHEETS—SHEET 1.
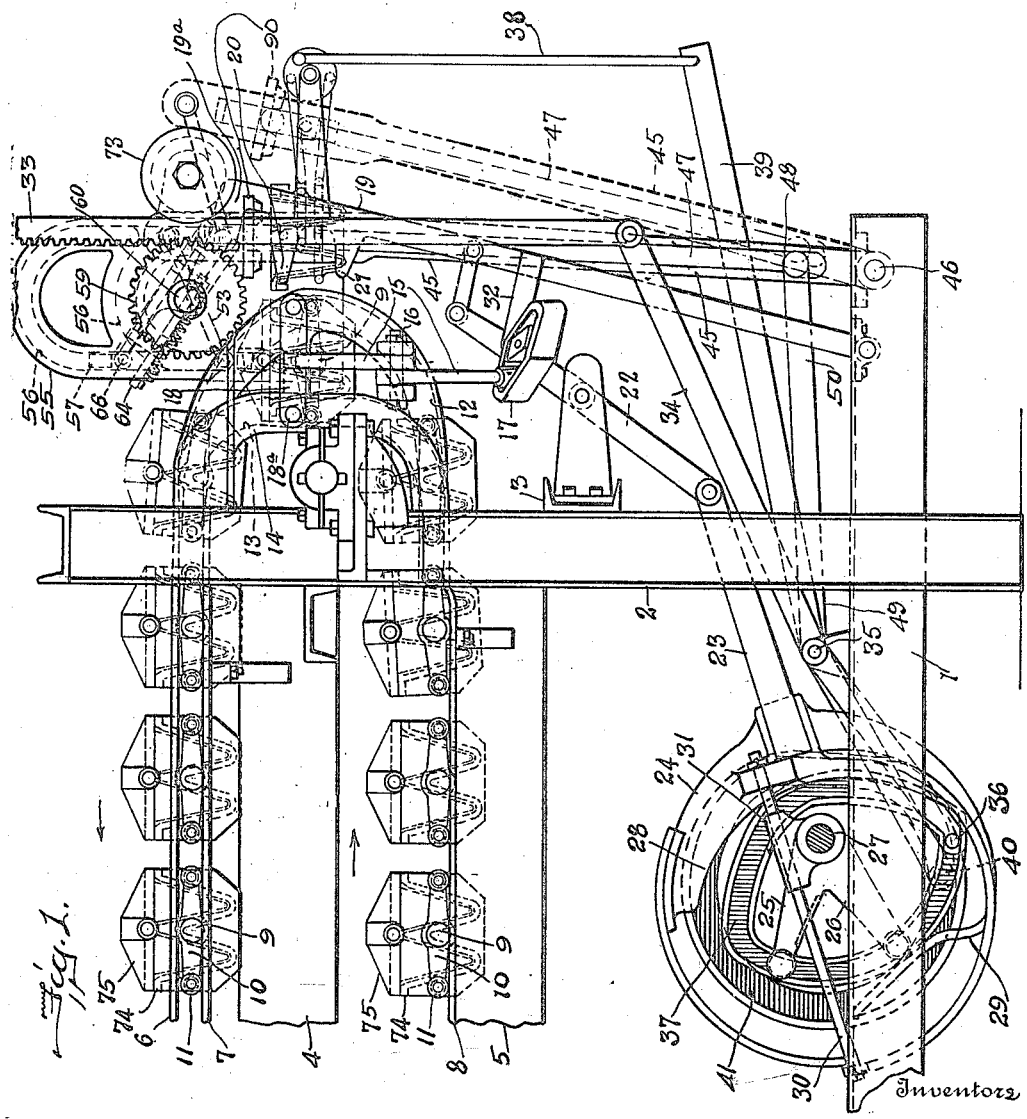
WEBSTER M. ROBERTS,
PARK D. ROBERTS,
Inventors
By Toulmin & Toulmin,
Attorneys

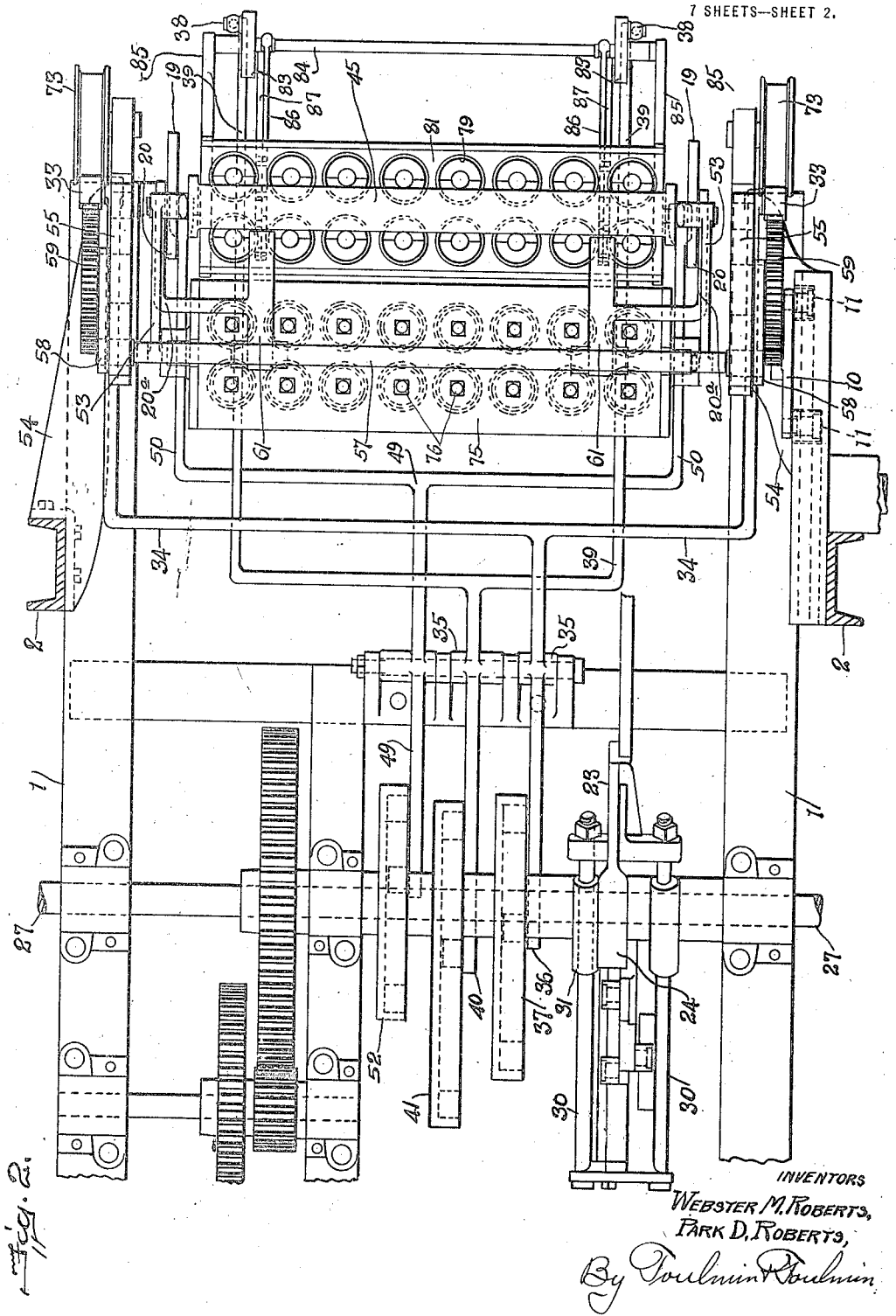

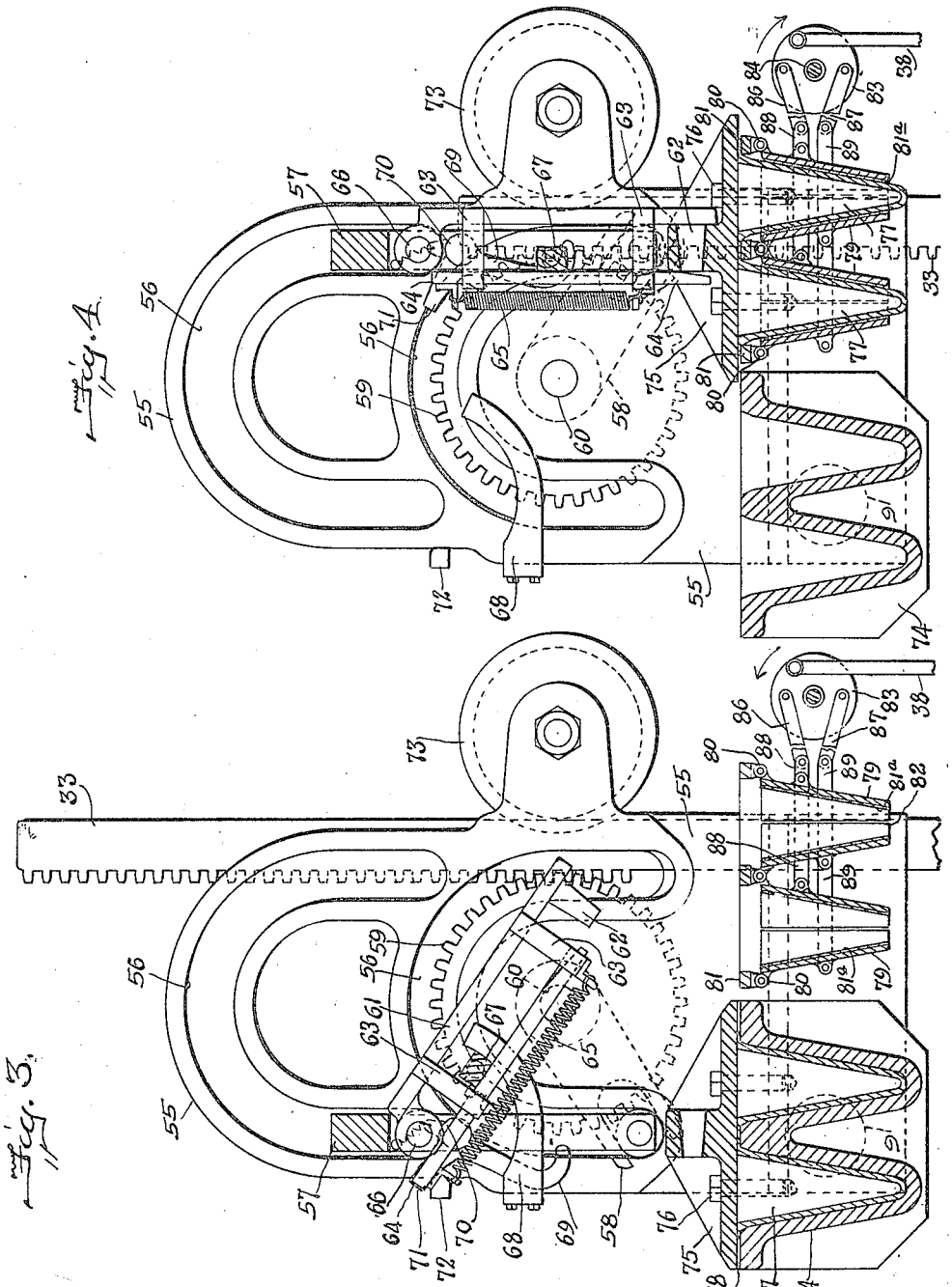

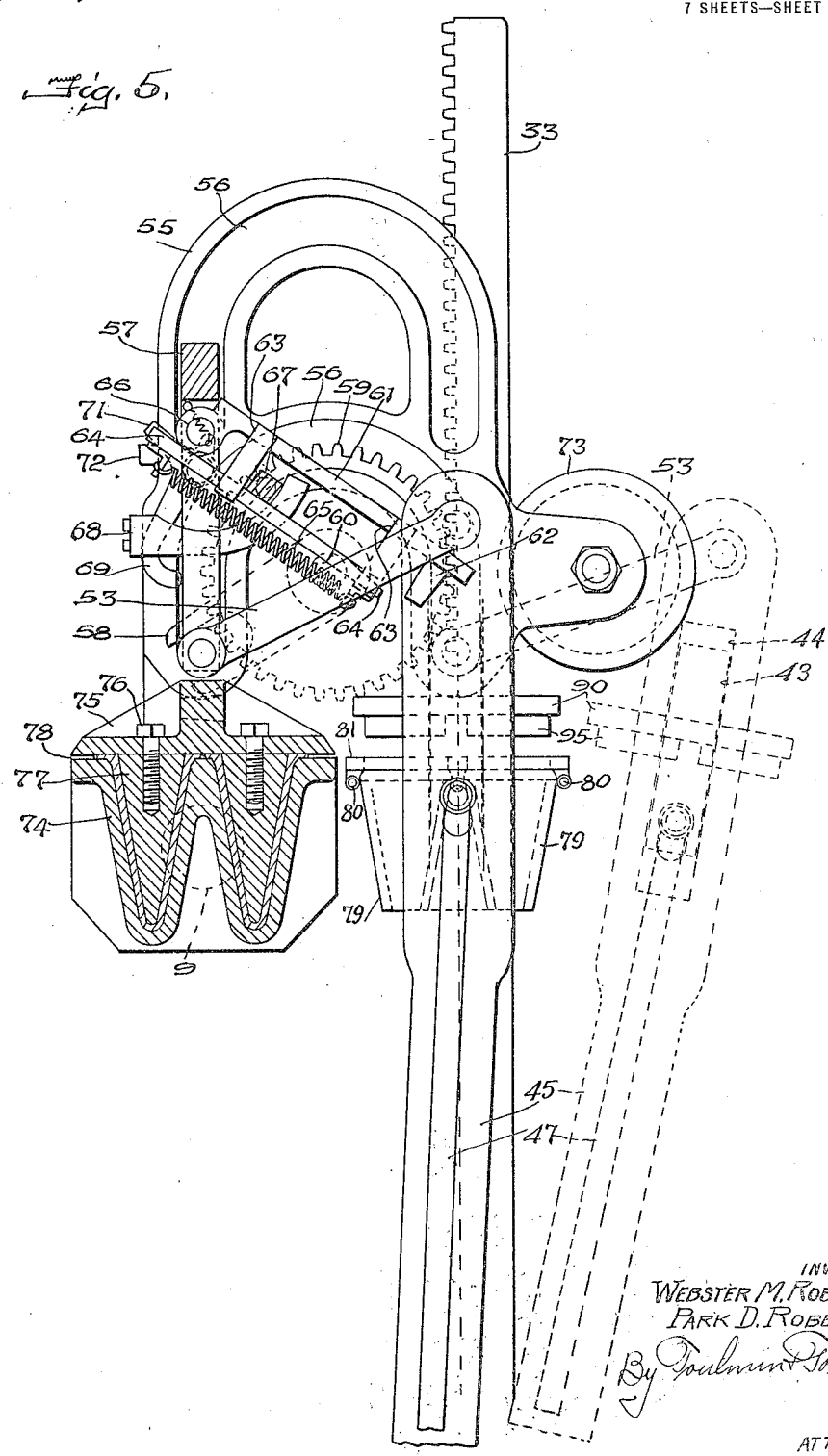

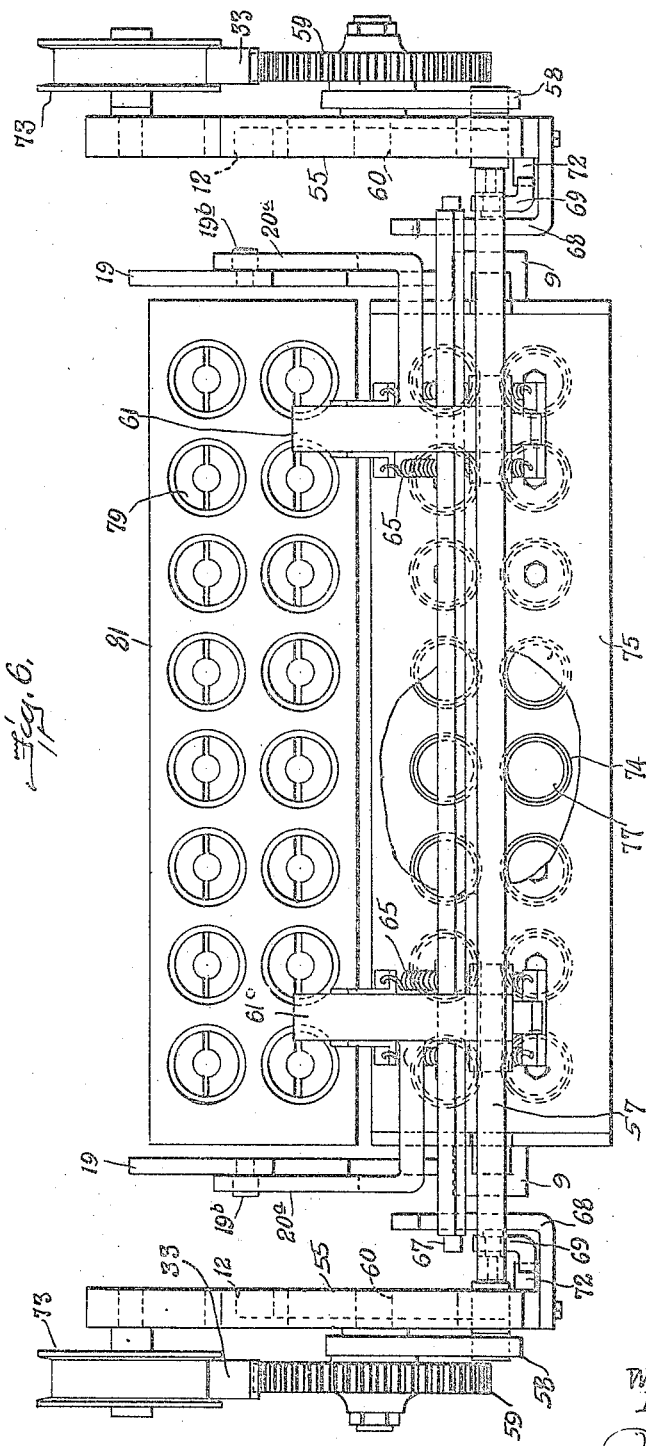

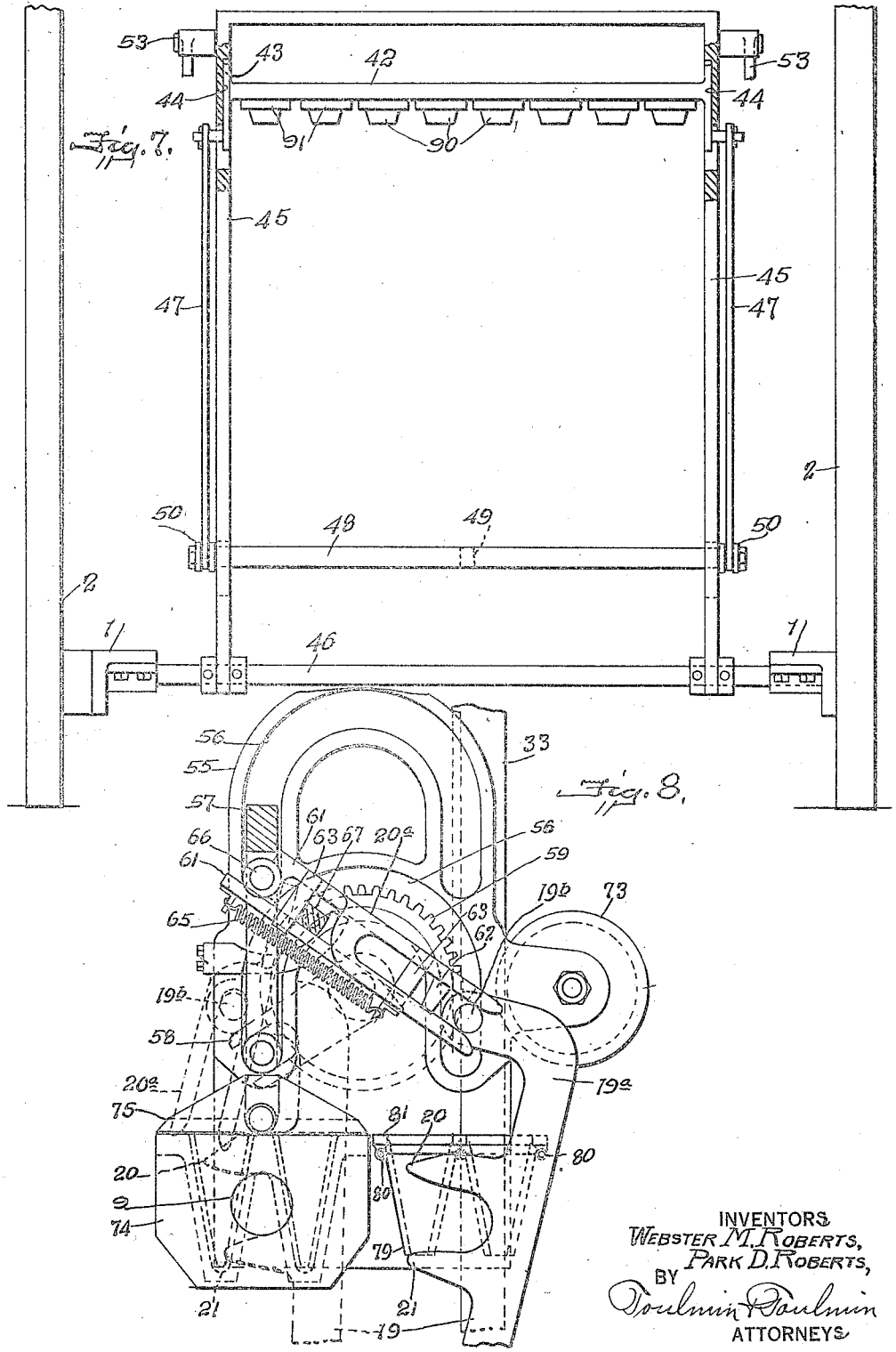

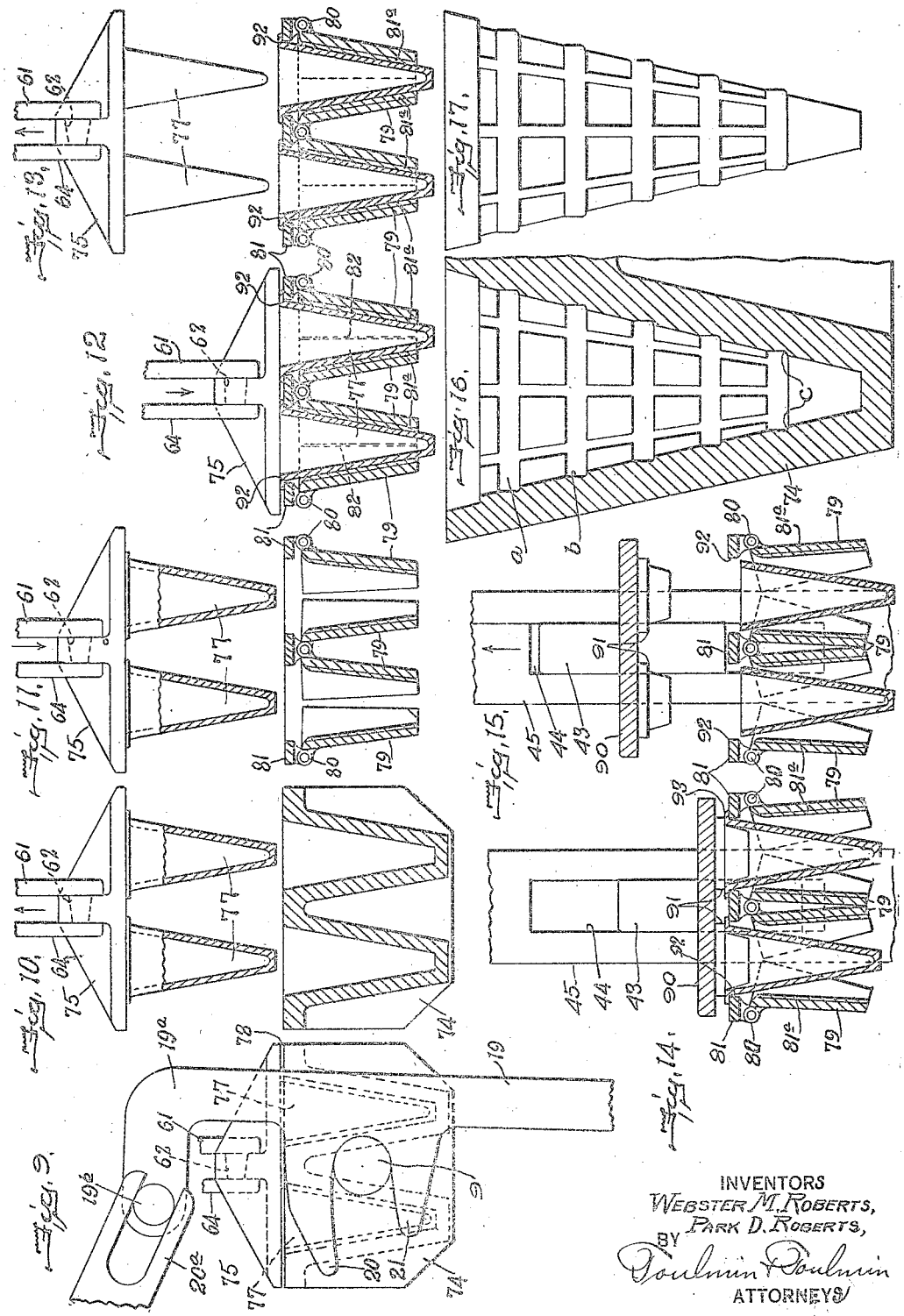

UNITED STATES PATENT OFFICE.

WEBSTER M. ROBERTS AND PARK D. ROBERTS, OF ST. JOSEPH, MISSOURI.

MACHINE FOR AND METHOD OF MAKING PASTRY CONES.

1,423,259. Specification of Letters Patent. Patented July 18, 1922.

Application filed February 7, 1921. Serial No. 443,062.

*To all whom it may concern:*

Be it known that we, WEBSTER M. ROBERTS and PARK D. ROBERTS, citizens of the United States, residing at St. Joseph, in the county of Buchanan and State of Missouri, have invented certain new and useful Improvements in Machines for and Methods of Making Pastry Cones, of which the following is a specification, reference being had therein to the accompanying drawing.

This invention relates to improvements in machines for and in a method of making pastry cones. In respect to the machine the invention refers particularly to:—

(1) An organization comprising non-openable or solid baking molds to receive the batter, forming cores operable to enter into the molds and remain during the baking operation, for forming the interior of the product, and to withdraw therefrom, taking with them the baked product, and cone grippers adapted to receive the cores and the impaled cones, to engage the cones and hold them while the cores withdraw and then to discharge the cones.

(2) This organization just set forth with the further provision that this mold shall come to rest and remain momentarily stationary during the period of the withdrawal of the cores with the impaled cones; and also with the further provision that the cone grippers will close upon the impaled cones after the cores enter the grippers to hold the cones while the cores withdraw, and will then open to discharge the cones.

(3) The organization set forth in paragraph numbered 1 with the further provision that the configurations in the cavities of this mold for ornamenting the exterior of the cones are such as to permit the withdrawal of the cones by the act of the withdrawal of the cores with the cones impaled upon them; and the further provision that the devices comprising the cone grippers will by reason of the nature of their faces which contact with the cones take hold and retain the cones while the cores are withdrawing, these grippers then operating to discharge the cones.

(4) The coordination and combination with said cone grippers of instrumentalities which will engage the cones while in the grippers, (after the cores have withdrawn), and act to trim the surplus material from the large end of the cone, caused by the overflow of batter in the mold, for the more ready discharge of the cones from the grippers and for the mechanical completion of the product.

In addition to the foregoing there are other features of our invention which are incident thereto, as will be hereinafter more fully explained.

In respect to the method our invention relates particularly to:—

(*a*) The removal of one cone-forming instrumentality (the cores) from the other (the mold) with the cones impaled on the first-mentioned instrumentality;

(*b*) The entrance of said instrumentality and impaled cones into a gripping instrumentality where a gripping action upon the cones is effected;

(*c*) In the separation of the impaling instrumentality from the cones while the latter are being subjected to the gripping action;

(*d*) In subjecting the cones to a trimming action to remove surplus material;

(*e*) In relieving the cones of the gripping action at or about the time of the trimming action; and (*f*) In discharging the finished product on the completion of the trimming action.

In the accompanying drawings:—

Fig. 1 is a side elevation of the mechanism of our invention and so much of an endless chain type of cone making machine as is necessary to illustrate the coordination of the present invention with that type of machine;

Fig. 2 is a plan view of the mechanism shown in Fig. 1 with the supporting and guiding tracks and the several molds omitted;

Fig. 3 is an enlarged side elevation and sectional view of one of the molds, a set of cores, their operating mechanism and a set of cone grippers, showing the cores and cones in the mold;

Fig. 4 is a like view showing the cores and cones transferred to and into the cone grippers;

Fig. 5 is a partial elevation and partial sectional view showing the molds, cores, grippers and trimmer and the mechanism for guiding the cores and trimmers from one position to another.

Fig. 6 is a plan view, on an enlarged scale, of the mechanism illustrated in Figs. 3 and 4, together with certain adjacent devices;

Fig. 7 is an enlarged elevation, partly in section, of the punch member of the trimmer and its actuating mechanism;

Fig. 8 is an enlarged detail view showing the mold, the bar for holding it, the core bar, the core lifting frame and the connection between said frame and the mold holding bar;

Fig. 9 is an end view showing a mold held stationary during the period of the withdrawal of the cores and impaled cones;

Fig. 10 is a similar view showing the cores and impaled cones in the stage of withdrawal from the mold;

Fig. 11 is a similar view showing the cores and impaled cones in the act of entering the nearly closed cone grippers;

Fig. 12 is a similar view showing the cores and impaled cones fully entered into the grippers which have now closed on the cones;

Fig. 13 is a similar view showing the cores withdrawn from the cones in the grippers and on their way back to the mold;

Fig. 14 is a similar view showing the grippers open and the trimmers in the act of removing the surplus material from the cones, whence the latter will drop through the grippers;

Fig. 15 is a similar view with the trimming punches removed from the timming position, the grippers open and the trimmed cones discharging;

Fig. 16 is a sectional view showing one of the mold cavities and the channels therein for configurating the exterior of the cones; and Fig. 17 is a side elevation of the ultimate product or cone now formed, baked and delivered from the machine and illustrating one pattern of exterior ornamental configurations adapted for permitting of the lifting of the cones out of the molds by the withdrawal of the cores.

As stated, we have illustrated so much of an endless chain type of cone making machine as is necessary to show the application of the present invention to that type of machine. But it is to be understood that this invention is not in practice limited to use with that particular or endless chain type, as these improvements are applicable to other types of cone making machines. In these illustrations a part of a general frame is indicated by the numerals 1, 2, 3, 4 and 5. This frame work also includes a track comprised of members 6 and 7 for supporting and guiding the mold units—(each dual mold and its dual cores) as they are made to travel by any suitable mechanism (as for instance, an endless chain) through the circuit of the machine, being likewise guided and supported on the return movement by the rail 8. Of course, it will be understood, that when the mold units pass through half of a circle between the guides 6 and 7 and the guide 8 they become inverted, the units being reinstated to upright position, as they are shown in the lower part of Fig. 1, as well as in the upper part. This inversion of the molds is due to their passing through half a circle at the rear end (not shown) of the machine. They are reinstated to upright position in the manner herein described.

It will be noted that each mold unit has a trunnion 9 which rests on the supports 7 and 8 and each a bar 10 rigid with the mold structure and having rollers 11 which travel on the supports.

When each mold unit reaches the front portion of the machine, that shown at the right in Fig. 1, one end of these bars with their rollers enters the portion 12 of a track while the other ends of the bars and their rollers enter the portion 13 of a track, these track members being contiguous with the upper and lower guides 6, 7 and 8. By reason of the entrance of the respective ends of the bars 10 into these respective track members 12 and 13 the mold units are kept in upright position so that when each unit comes to rest at the discharge location indicated at 14, the contained cores and cones will be in position for withdrawal. And it is at this time that each succeeding mold unit, when it arrives at the position 14 is engaged by fastening-devices. These are comprised, first, of a pivoted arm 15 supported at 16 and operated at one end by a suitable cam 17 and having at the other end a cross arm 18 having pins 18$^a$ which are made to move over and contact with the upper surface of the bar 10 while a lever 19 is made to move over so that its jaws 20 and 21 will embrace the trunnion 9 and thus hold the mold firmly during the brief period of rest while the cores and cones are automatically withdrawing.

The bar 19 is suitably actuated by a lever 22 which is operated in any desirable manner, as by means of a pitman 23 reciprocated at appropriate intervals by a yoke 24 operated by throw arms 25, 26 mounted on the major shaft 27 and adapted to engage first the cam surface 28 of the yoke 24 and then the cam surface 29. The yoke 24 being mounted on slide rods 30 which travel in bearings 31 suitably supported on the major shaft, the yoke will reciprocate through the means described in a manner and at the proper time to cause the bar 19 and its holding jaws to engage and disengage the mold trunnion. As the cam 17 is carried on a projection 32 secured to the bar 19 it will be understood that the lever 15 and the bar 19 are actuated at the same time to fasten and release the mold. These are merely one form of devices for this purpose and do not constitute in themselves any feature of the present invention as the mold may be held properly in any other manner for purposes of the withdrawal of the cores and impaled cones and the return of the cores.

It will be further understood that the machine with which our present invention shall be used will include such features as will properly position the cores with respect to the mold during the period when the batter is being introduced into the cavities and likewise during the period following, as when the batter is throwing off steam during the early stages of the baking operation. So far as concerns the present invention all mechanism for these latter purposes are adjuncts of the machine with which this invention is to be used.

We would also observe at this point that actuating mechanism is provided for imparting the required movement to the cores, for also imparting the required movement to the devices which open and close the grippers, for positioning the trimmers with respect to the cones in the grippers and for giving the trimmers their trimming and receding movements. For these respective purposes we employ, as one form of mechanism, a rack bar 33 actuated by a lever 34 pivoted at 35 and engaging at its heel 36 with a properly shaped cam 37 carried by the master shaft 27 and adapted to properly time the movements of the rack bar 33 for the due actuation of the cores.

For actuating the opening and closing devices for the grippers we employ, as one means, a pitman 38 connected with a lever 39 also fulcrumed at 35 and having its heel 40 adapted for engagement with a cam, 41, shown in Fig. 1, and appearing at 41 in Fig. 2, as also does the yoke 24. And the actuating mechanism for giving the trimmer its trimming and reverse movements is comprised (see Figs. 2 and 7) of the cross head 42 having slides 43 which travel in ways 44 formed in the bars 45 pivoted on a shaft at 46, as seen in Figs. 1 and 7. The slides 43 connect with pitman 47 which, in turn, connect with a sliding shaft 48 mounted in the bars 45 and movable by a lever 49 connected by the yoke arms 50 to the shaft 48. The lever 49 is operated by a suitable cam shown at 52 in Fig. 2. This cam is so fashioned that when the bars 45 have swung to bring the punch members of the trimmers over the die members 81 and the cones in the cone grippers the trimmers will come down upon the cones and act on them in the manner illustrated in Fig. 14. And in order to throw the bars 45 into proper position for this purpose they are equipped with links 53 which connect with a travelling element of the core-moving devices, to be later described, but see Fig. 5.

At or near the discharge place where the mold temporarily comes to rest for discharging purposes we erect, and suitably connect with the frame of the machine, as by brackets 54, a pair of arches 55, one at either side. These arches contain ways or guides 56 in which travel the core lifters, by which the cores are lifted or removed from the mold while the mold temporarily stands for unloading. These lifters remove the cores with their impaled product over to the cone grippers into which the cores and their cones are inserted. These core lifters comprise a travelling frame or carriage 57 adapted to travel in the ways 56. The carriage is given its travelling movements from over the mold to a position over the cone grippers, and by reverse movement they travel back from over the grippers to over the molds. These motions are imparted to the carriers by an arm 58 connected with a gear wheel 59 whose stud shaft 60 is mounted in the side plates of the arches 55. There are two of these gears 59 each with its arm 58, as also two of the rack bars 33 operated in the manner before described. At suitable intervals the rack bars are reciprocated, first, in a downward movement to turn the arms 58 clockwise to lift the cores from the mold and place them in the cone grippers and then in the opposite direction to actuate the arms anti-clockwise to lift the cores from the grippers and carry them back to the molds.

The lifting frame, comprised of bars 61 carrying pins 62 and plates 63 in which is slidably mounted a bolt 64 controlled by a spring 65 secured at one end to one plate 63 and at the other to the bolt, is pivotally mounted in the carriage 57, as shown at 66. This lifting frame also carries a transverse rod 67 whose office is to ride upon the cam surface of a horn 68 secured to the arch 55, to lift the bolt 64 to a position which will prevent it from striking the core bar when the lifting frame 61 is swung down by a means to be presently stated.

If it be now assumed that the carriage 57 is elevated from the position shown in Fig. 3, by the means before described, and the lifting frame and cores be thereby also elevated, it will soon transpire that the bar 67 will be lifted clear of the horn 68 and that the bolt 64 will tend to snap downward by the action of the spring 65 and assume the position against the core bar, as shown in Fig. 4, to tend to keep the lifting pin 62 in place.

But in order to make the pivotal connection of the lifting frame 61 with the carriage 57 substantially rigid to prevent any swaying of the frame and the cores we provide a device to lock the frame with reference to the carriage.

This device consists of a hook 69 secured to the carriage at 70 and arranged to receive the cross bar 67 when it and the hook are sufficiently elevated above the horn 68. With the bar 67 resting in the hook 69 the lifting frame will be prevented from any swinging motion during the travel of the carriage 57.

On the return of the carriage and lifting frame from the position shown in Fig. 4 to the position where the cores are returned to the mold it becomes necessary to draw the bolt 64 upward so that when, a little later, the lifting frame is to disengage from the core bar, the bolt will not stand in the way; and also necessary to disengage the cross bar 67 from the hook. This latter is done by the extension 71 of the hook coming in contact with a lug 72 on the arch 55. This snaps the hook from under the bar 67 and then when this bar reaches the horn 68 the bolt 64 is prevented from further descent while the frame 61 goes on down to the point of delivering the cores in the mold.

In order to insert the lifting pin 62 into the orifice in the core bar, and in order to remove the pin from the core bar some instrumentality must be employed. A convenient device for this purpose consists of an extension 19$^a$ on the lever 19 and a roller 19$^b$ adapted to engage through an arm 20$^a$ with the lifting frame 61, as indicated in Fig. 8, so that when this lever 19 moves laterally to cause its jaws 20 and 21 to engage with the mold to hold it during the withdrawal and until the return of the cores, the roller 19$^b$ will cause the frame 61 to swing down and its pin 62 to enter the orifice in the core bar. And likewise when the lever 19 withdraws to release the mold the roller 19$^b$ will swing this frame 61 and disengage the lifting pin 62 from the core bar. A guide roller 73 acts to guide the rack bar 33 and keep it in mesh with the gear wheel 59.

The several instrumentalities we have thus described for these several operations may, of course, be varied in type and construction so long as the essential functions set forth are performed. We are not limiting ourselves to special devices for these functional purposes.

We shall now describe the mold, the cores and the cone grippers and their relation. See particularly Figs. 3, 4 and 5. Besides the features of the trunnions 9 and guiding bars 10 and rollers 11, before referred to, each mold consists of a solid body bored out or otherwise fashioned with cavities, preferably two series in each mold, as clearly shown in Figs. 3 and 4, and 2 and 6. These molds are solid in the sense that they are not in halves or members which are separable. As also before stated, these molds travel in succession one after another and successively stop at the discharge place indicated in Fig. 1 which is the position shown also in Figs. 3 and 4. The batter from which the product is to be made is inserted in the mold cavities in any desirable or approved way and at the proper time in the cycle of operations, that not having to do with the present invention. The numeral 74 specifically refers to the mold proper.

The cores comprise a core bar 75 to which is attached, as by screws 76 or otherwise, a series of conical cores 77 like in number and shape to the cavities in the molds. Each mold has its set of cores with their core bar. The cores are just enough smaller than the cavities to leave an intervening space to be occupied by the batter which, when baked, will form the cone or product. Due to the expansion of the steam produced from the moisture in the batter the cores are slightly lifted at one stage of the operation, leaving a slight space, such as that shown at 78 in Fig. 3, through which the steam escapes and into which some of the batter overflows or enters, leaving a slight rim or bead on the exterior of the product which is later trimmed off.

When the cores are lifted out of the molds, in the manner before described, they will take with them the now baked cones. And it is a curious circumstance, but a fact, that in practice, the adherence between the baked cones and the cores is greater than the adherence between the cones and the molds, and that even filigree work on the exterior of the cones and interior of the mold cavities will not (unless made unnecessarily deep in the cavities) prevent the cones from following the cores. Accordingly, we lift our cones out of the solid molds by the withdrawal of the cores.

Now the next step is to remove, positively yet delicately and very rapidly, the cones from the cores. The instrumentality for this purpose we have denominated as cone grippers by which we mean that the instrumentality takes such hold upon the cones as to permit the separation of the cores and cones without injury to the latter and also in a manner to permit the cones to be rapidly released. The form of this gripper which we have selected for illustration we will now describe. It comprises a series of pockets corresponding in number to the cones to be stripped and corresponding essentially to them in shape. Each pocket is formed by walls, such as designated at 79 hinged at 80 and divided into sections, say two to each gripper proper. The pivots 80 are carried by any suitable support, but preferably by the die member 81 of the trimming mechanism, the punch member entering the die member, as will presently appear.

It will be noted that the walls 79 are in pairs so that they can be separated by swinging on their hinges. They are lined, preferably with felt, as shown at 81$^a$, or other suitable material, to form a gripping cushion to take hold of the cones, yet as we have found in practice, without injury to them. When the cores with the impaled cones enter the cone grippers, as shown in Figs. 11 and 12, the grippers are slightly open in the sense that their walls stand just a little apart, as indicated by the dotted lines 82 in Fig. 12. We have before referred to the pitman and lever 38 and 39 and the operating cam to actuate the sections or halves of the grippers. The pitman 38 connects with disks 83 mounted on a cross shaft 84 carried in suitable brackets 85 supported by any suitable connection with the main frame. When the disks 83 are rotated in the direction of the arrow, as shown in Fig. 3, they will close from a slightly open position upon and take hold of the cones, which operation is timed by a suitable cam 41 to take place just as the cores with the impaled cones have fully entered the grippers. This has just taken place when the parts are in the position shown in Fig. 4.

The cones being now under the control of the grippers the cores can and do withdraw and quickly return to reenter the mold from which they brought those particular cones, when they will be released from the core lifters and their mold will move on and be manipulated for a refilling of the mold cavities. And the cores having now withdrawn and left the cones in the grippers, the grippers will open wide, severing themselves from the cones and permitting the latter to rapidly and quickly discharge or descend after they have been trimmed or relieved of their excrescent edges by the trimmers. The preferred form of devices to actuate the gripper sections comprise links 86 and 87 connected at one end to the disks 83 and bars 88 connecting the link 86 to one member of each gripper and other bars 89 connecting the link 87 to the other member of each gripper.

Coming now to the trimming operation we would observe that immediately the cores have withdrawn from the cones which are now in the grippers, the punch members 90 of the trimmers swing over from the dotted positions shown in Figs. 1 and 5 to the full line positions shown in Figs. 1 and 5 when by a sudden downward movement effected by the mechanism shown in Figs. 1 and 2 they enter the die members 81 and enter also the cones. The shearing edge 91 coacting with the shearing edge 92 now severs the surplus bead 93 or rim from the cones. The grippers being now opened, as before stated, the completed product or cones rapidly fall in such succession as amounts almost to a shower, all of these operations being properly synchronized and rapid and precise. After each trimming operation the punch members withdraw because by that time another set of cores with their impaled cones are on their way to the grippers which in the interval have almost closed, leaving their final closing to take place when the cores and impaled cones shall have actually entered the grippers, as before described.

Referring to Fig. 16, it will be observed that we have so formed the recesses or channels $a$, in the solid mold that the cones can be withdrawn therefrom notwithstanding that the molds are not openable. We have avoided interlocking the product with the mold, which interlocking has required that the mold be made in separable portions or halves. We depart from that plan and make our mold solid in the sense that it is not of separate pieces openable one from the other. And it will be observed also that our ornamenting recesses or channels $a$ encircle the cones. But notwithstanding this, and the fact that the mold is solid, we readily withdraw our cones by the fact that we make the wall $b$, of the channel substantially parallel to the axis of the cavity. We also make a slightly rounding corner $c$ in the channel to prevent the formation of too sharp an edge on the ornament as it appears on the cone.

By these provisions we readily withdraw our cones from the solid mold by the adherence of the cones to the cores. And hence we readily and rapidly withdraw the cones impaled on the cores from the mold, transfer them to and into the grippers where we take hold more firmly upon the cones and thereby are enabled to withdraw the cores, leaving the cones in the grippers to be readily discharged.

For a fuller understanding and disclosure we will now refer to the series of diagrammatic drawings embraced in Figs. 9 to 15, inclusive;

In Fig. 9 is a mold held at its unloading position with the cores and impaled cones about to be removed;

In Fig. 10 we have the cones with their cores removed and on their way to the position shown in Fig. 11;

In Fig. 11 the cores and impaled cones are just entering the slightly opened grippers;

In Fig. 12 the cores and cones have fully entered the grippers and the latter have closed and taken hold of the cones;

In Fig. 13 the cores have withdrawn from the cones and left the latter in the grippers while the cores are on their way back to the molds from which they came;

In Fig. 14 we have the trimmers descended upon the cones and in the act of removing the excess material while the grippers have also opened for the discharge of the cones when the trimming is completed; and In Fig. 15 we have the punch members of the trimmer returning from trimming position and the finished cones falling through the open grippers to any suitable place of delivery.

Having now fully set forth our apparatus we will describe the method branch of this invention, of which this apparatus is one means of carrying it into effect.

It will be observed that our method commences with the removal of the baked product from the molds. It consists in the following steps: (a) the removal of one cone-forming instrumentality (the cores) from the other (the mold) with the cones impaled on the first named instrumentality; (b) the entrance of said instrumentality and impaled cones into a gripping instrumentality where a gripping action upon the cones is effected; (c) in the separation of the impaling instrumentality from the cones while the latter are being subjected to the gripping action; (d) in subjecting the cones to a trimming action to remove surplus material; (e) in relieving the cones of the gripping action at or about the time of the trimming action; (f) in discharging the finished product on the completion of the trimming action.

Thus by our improved apparatus and method we provide for the rapid and economical treatment of batter cones in all of those steps which go to their completion from and after they have been baked, which latter may be done in more or less of the several ways already known in this art.

Having thus fully described our invention, what we claim as new and desire to secure by Letters Patent, is:—

1. In a cone making machine, the combination, with a cone-forming unit comprising a solid mold with cavities and corresponding cores, of cone grippers comprising members adapted to receive the cores with their impaled cones, mechanism to withdraw the cores and impaled cones from the mold, insert them into the grippers and to return the cores to the mold, and other mechanism to cause the grippers to release the cones.

2. In a cone making machine, the combination, with a cone-forming unit comprising a solid mold with cavities, and corresponding cores, of cone grippers comprising adjustable members adapted to receive, hold and release the cones, mechanism to hold the mold stationary momentarily, mechanism to remove the cores with the cones impaled thereon from the mold and to cause the cores and cones to enter the grippers and the cores to withdraw therefrom and reenter the mold, and means to cause the grippers to hold and release the cones during the interval between the departure and return of the cores.

3. In a cone making machine, the combination, with a solid mold and corresponding cores, of cone grippers comprising movable members, mechanism to remove the cores with the cones impaled thereon from the mold, to insert them in the grippers and return the cores to the mold, and other mechanism adapted to cause the gripper members to clamp the cones when they have properly entered the grippers and to release the cones after the cores have broken contact with the cones.

4. In a cone making machine, the combination, with a solid mold and cone grippers in convenient juxtaposition therewith, the grippers comprising operable members for gripping and releasing the cones, of cores corresponding with the mold cavities and mechanism adapted to automatically engage with the cores and remove them from the mold with the cones impaled thereon, to thence travel with the cones into the grippers and back again from the grippers to the mold after the cores sever connection with the cones, and devices to cause the grippers to take hold of and release the cones.

5. In a cone making machine, the combination, with a cone-forming unit comprising a solid mold with cavities and corresponding cores, of cone grippers comprising members adapted to receive the cores with their impaled cones, mechanism to withdraw the cores and impaled cones from the mold, insert them into the grippers and to return the cores to the mold, other mechanism to cause the grippers to release the cones, and trimming mechanism adapted to trim the cones at a time between the withdrawal of the cores and the discharge of the cones from the grippers.

6. In a cone making machine, the combination, with a cone-forming unit comprising a solid mold with cavities, and corresponding cores, of cone grippers comprising adjustable members adapted to receive, hold and release the cones, mechanism to hold the mold stationary momentarily, mechanism to remove the cores with the cones impaled thereon from the mold and to cause the cores and cones to enter the grippers and the cores to withdraw therefrom and reenter the mold, means to cause the grippers to hold and release the cones during the interval between the departure and return of the cores, and trimming mechanism adapted to trim the cones at a time between the withdrawal of the cores and the discharge of the cones from the grippers.

7. In a cone making machine, the combination, with a solid mold and corresponding cores, of cone grippers comprising movable members, mechanism to remove the cores with the cones impaled thereon from the mold, to insert them in the grippers and return the cores to the mold, other mechanism adapted to cause the gripper members to clamp the cones when they have properly entered the grippers and to release the cones after the cores have broken contact with the cones, and trimming mechanism adapted to trim the cones at a time between the withdrawal of the cores and the discharge of the cones from the grippers.

8. In a cone making machine, the combination, with a solid mold and cone grippers in convenient juxtaposition therewith, the grippers comprising operable members for gripping and releasing the cones, of cores corresponding with the mold cavities and mechanism adapted to automatically engage with the cores and remove them from the mold with the cones impaled thereon, to thence travel with the cones into the grippers and back again from the grippers to the mold after the cores sever connection with the cones, devices to cause the grippers to take hold of and release the cones, and trimming mechanism adapted to trim the cones at a time between the withdrawal of the cores and the discharge of the cones from the grippers.

9. In a cone making machine, the combination with a solid mold and corresponding cores, of devices to momentarily hold the mold stationary, and mechanism adapted to remove the cores with their impaled cones from the mold, to deliver the cores with such cones to a point somewhat remote from the mold for the discharge of the cones and to return the cores into the mold.

10. In a cone making machine, the combination, with a solid mold and devices to hold it momentarily stationary, of corresponding cores and core actuating mechanism comprising ways, a carriage adapted to travel therein, and a lifting frame mounted on the carriage, devices to cause the frame to engage with and disengage from the core bar, and operating devices to cause the carriage to travel in the ways.

11. In a cone making machine, the combination, with a core bar having cores, of actuating mechanism therefor comprising an arch having ways, a carriage adapted to travel in said ways, devices to impart motion to the carriage first in one direction and then in the other in the ways, and a lifting frame carried by the carriage and comprising a lifting bar proper and a bolt for engaging with and releasing the core bar.

12. In a cone making machine, the combination, with a solid mold and cone grippers, of cores adapted to enter and withdraw from the mold and enter and withdraw from the grippers, and actuating mechanism to impart such motions to the cores, said mechanism comprising an arch having ways, a carriage adapted to travel in the ways, a lifting frame connected with the carriage and adapted to engage and disengage the bar of the cores, a gear, crank and rack mechanism to actuate the carriage, and devices to actuate the lifting frame into and out of engagement with the bar.

13. In a cone making machine, the combination, with an arch having ways, of a carriage adapted to travel in the ways, a lifting frame connected to the carriage and comprising a tie bolt to engage and disengage a core bar, devices to control the movements of the bolt for securing and releasing the bar, a rack, gear and crank for actuating the carriage, and devices for actuating the lifting frame into and out of engagement with the bar.

14. In a cone making machine, the combination, with a solid mold and cores therefor, for forming the cones, means to insert and remove the cores into and form the mold and cone grippers adapted to receive the cones from the cores and to grip and to release them.

15. In a cone making machine, the combination, with a solid mold for forming cones, of a cone gripper adapted to receive the cones and to release them, and devices to hold the grippers slightly open until the cones have properly entered, then to close the grippers to clamp the cones and later to open the grippers to discharge the cones.

16. In a cone making machine, the combination, with a solid mold, of cone grippers in proximity thereto, and trimming mechanism adapted to act on the cones at a point between the mold and the grippers.

17. In a cone making machine, the combination, with a solid mold, of grippers in proximity thereto, the grippers comprising members adapted to close upon and recede from the cones when they have entered within the grippers, and trimming devices comprising a die member located near the entrance to the grippers and a punch member adapted to descend to the die member and trim the cones.

18. In a cone making machine the combination with cores for forming cones, of a cone gripper comprising members adapted to receive, clamp and release the cones, and actuating devices for the members adapted to close them upon the cones and later to open them from the cones.

19. In a cone making machine, the combination, with cores adapted for having cones impaled thereon, of cone grippers adapted to receive the cores with the impaled cones, the grippers comprising members arranged to close and grip the cones while the cores are withdrawing and to later open to discharge the cones, and devices to so actuate the gripper members.

20. In a cone making machine, the combination, with cores adapted for having cones impaled thereon, of trimming mechanism comprising a die member adapted to receive the cores with impaled cones, and grippers also to receive the cores and impaled cones as they pass through the die member, and devices to actuate the grippers to grip the cones while the cores are withdrawing and to release them thereafter, and a punch member of the trimmer adapted to enter the die member, trim the cones and allow them to pass through the grippers.

21. In a cone making machine, the combination, with cone grippers comprising hinge members adapted to close to grip the cones and to swing open to release them, and devices to so actuate the hinge members, of trimming mechanism comprising a die member located near the entrance to the grippers, punch members, a swinging frame to carry the punch members to and from the die member, and mechanism to actuate the frame and to operate the punch members to and from the die member.

22. In a cone making machine, a cone gripper comprising members adapted to receive and release the cones, and having a yielding lining for cushioning the grip on the cones and means to actuate said members.

23. In a cone making machine, cone grippers comprising members divided into hinged halves which, when substantially closed form receptacles corresponding substantially with the size and shape of the cones and having a cushioned lining, and mechanism to close the member sufficiently to grip the cones and to open the members to discharge the cones.

24. In a cone making machine, the combination, with a solid mold having cone-shaped cavities provided with channels to form exterior configurations on the cones, the outer surfaces of the channels being substantially parallel with the axis of the cavities to permit of the withdrawal of the cones without obstruction by the configurations.

25. In a cone making machine, the combination, with forming cores having smooth exteriors, of solid molds having cavities adapted to receive said cores with an intervening space for the formation of cones, the mold cavities having channels to form exterior configuration on the cones, the outer walls of said channels being substantially parallel with the axis of the cavities to permit the cones to withdraw impaled on the cores.

26. In a cone making machine, the combination, with a solid mold having cone cavities provided with channels whose outer walls are substantially parallel with the axis of the cavities, of cone grippers forming cavities, and cores adapted to impale the cones thereon in the act of cooperating with the mold in forming the cones, and further adapted to withdraw from the mold with the cones impaled thereon and to enter the grippers and withdraw, leaving the cones gripped by the grippers.

27. The herein described method of treating batter cones after they are baked, consisting in removing them from molds impaled on a forming instrumentality, in introducing such instrumentality with the impaled cones into a gripping agency; in separating this interior forming instrumentality from the cones while they are under the control of the gripping agency; and in releasing the cones from such gripping agency to effect their discharge or delivery.

28. The herein described method of treating batter cones after they are baked, consisting in removing them from molds impaled on an interior forming instrumentality, in introducing such instrumentality with the impaled cones into a gripping agency, in separating this interior forming instrumentality from the cones while they are under the control of the gripping agency; in removing from the cones the surplus material, and in releasing the cones from such gripping agency to effect their discharge or delivery.

29. The herein described method of treating batter cones after they are baked, consisting in withdrawing them from an outer forming instrumentality by their adherence to an inner forming instrumentality; in transferring the cones while on this latter instrumentality into a gripping agency which acts on the cones with a cushioned gripping effect; in maintaining such latter effect during the withdrawal of the impaling agency; in applying a trimming action to the cones after such withdrawal; and in releasing such gripping action in time for the discharge of the cones as the trimming step is completed.

In testimony whereof, we affix our signatures.

WEBSTER M. ROBERTS.
PARK D. ROBERTS.